J. F. VALLENTYNE, DEC'D.
E. VALLENTYNE, ADMINISTRATRIX.
GRAIN BLOWER.
APPLICATION FILED APR. 12, 1921.

1,412,031.

Patented Apr. 4, 1922.

INVENTOR.
J. F. VALLENTYNE.
BY HIS ATTORNEY.
James F. Williamson

UNITED STATES PATENT OFFICE.

JOHN F. VALLENTYNE, OF MINNEAPOLIS, MINNESOTA; EMILY VALLENTYNE ADMINISTRATRIX OF SAID JOHN F. VALLENTYNE, DECEASED.

GRAIN BLOWER.

1,412,031.  Specification of Letters Patent.  Patented Apr. 4, 1922.

Application filed April 12, 1921. Serial No. 460,734.

*To all whom it may concern:*

Be it known that I, JOHN F. VALLENTYNE, a citizen of the United States, residing at Minneapolis, in the county of Hennepin and State of Minnesota, have invented certain new and useful Improvements in Grain Blowers; and I do hereby declare the following to be a full, clear, and exact description of the invention, such as will enable others skilled in the art to which it appertains to make and use the same.

This invention relates to a pneumatic elevator for grain or a grain blower.

It is an object of this invention to construct such a blower provided with a grain delivery conduit into which the grain is evenly fed from above and which feeding of the grain is effected and facilitated by the air blast.

It is a further object of the invention to provide such a blower having a grain delivery conduit and a grain chamber disposed over the same and delivery thereto, together with a means for feeding grain into said chamber. The latter means is provided with a friction drive adapted to be operated by a governor attached to the usual fan or blower. With this construction, the choking of the grain delivery conduit is avoided since, if any tendency to choke occurs, the feeding means delivering grain into the grain delivery chamber will cease to be driven and the grain and the grain delivery conduit will be quickly cleared.

Figure 1:
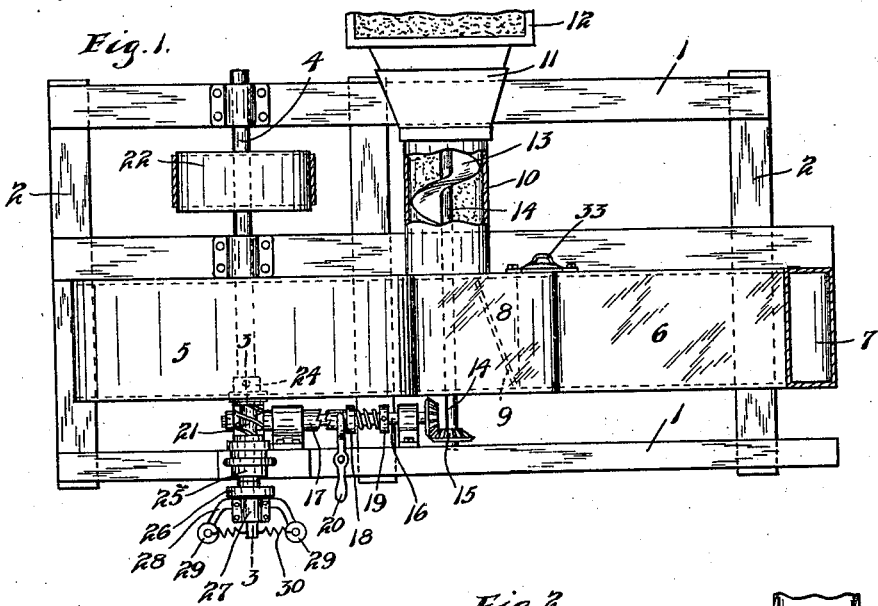
Figure 2:
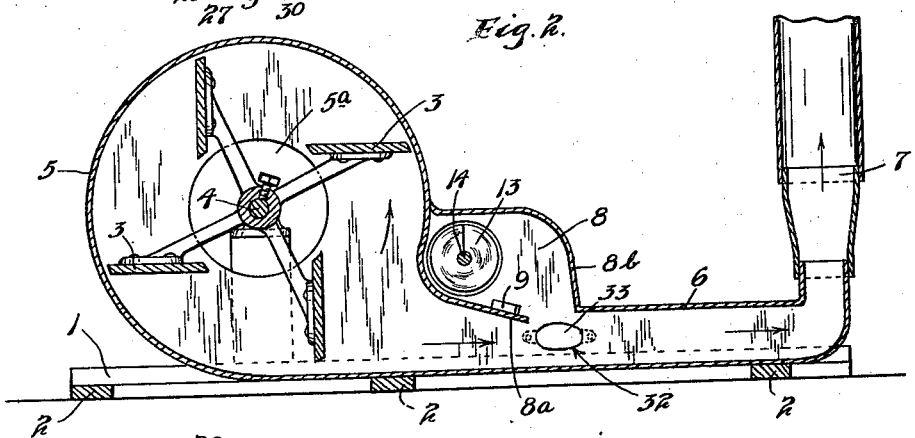
Figure 3:
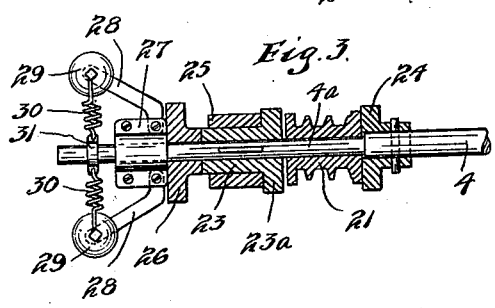

These and other objects and advantages of the invention will be clear from the following description made in connection with the accompanying drawings in which like reference characters refer to the same parts throughout the different views, and in which, Fig. 1 is a plan view of the device, a portion of which is shown in section;

Fig. 2 is a central vertical section through the fan chamber and said conduit; and Fig. 3 is a sectional view taken on the line 3—3 of Fig. 1.

Referring to the drawings, the device is shown as mounted upon a frame member consisting of longitudinally spaced timbers 1 and transversely extending spaced timbers 2. A fan or blower 3 is carried on a shaft member 4 and disposed in a fan casing 5. The fan casing 5 has the usual eye or an inlet opening $5^a$ and a delivery conduit 6 is connected to the lower portion thereof and has an upwardly extending portion at its end communicating with a vertically extending conduit 7. A grain chamber 8 is disposed over the conduit 6 adjacent the fan casing 5 and this chamber is shown as having a downwardly inclined floor $8^a$. This floor terminates short of the end wall $8^b$ of the grain chamber forming a feed opening from the grain chamber into the conduit 6. The floor $8^a$ of the grain chamber is shown as provided with an inclined cleat or feed bar 9 but has one of its ends adjacent the edge of said floor. The bar 9 will cause the grain fed into the grain chamber to pass along the entire width of the member $8^a$ and thus be evenly fed into the conduit. It will be noted that the edge of the floor member $8^a$ is disposed a slight distance below the top of the conduit 6 so that the cross section of said conduit directly under said edge is less than the area of the conduit beyond the feed opening. A conduit 10 leads from one side of the grain chamber 8 and has at its end a funnel member 11 connected to the grain hopper and delivery conduit 12. A conveyor 13 shown as of the common screw type is disposed in the conduit 10 and secured to and driven by a shaft 14 secured in suitable bearings and having secured thereto one of a pair of beveled gears 15, the other gear being mounted on a shaft 16 extending longitudinally of the fan and at right angles to the shaft 14. The shaft 16 is disposed at one end in a bearing fixed to the member 1 and at its other end in a sleeve 17 disposed in a similar bearing secured to the member 1. The sleeve 17 is formed on one end with clutch teeth and a sliding clutch member 18 is splined to the shaft 16 and adapted to have the teeth thereon engage the teeth on the sleeve 17. A collar 19 is pinned to the shaft 16 and a coil spring is disposed between this collar and the clutch member 18, which spring tends to move said clutch member into engagement. The members 17 and 18 thus form a well known half clutch and a lever 20 pivoted to adjacent frame member 1 is provided with a clutch fork adapted to engage the enlarged end of clutch member 18 to move and hold the same out of engagement with the sleeve 17. The sleeve 17 is provided at one end with a worm wheel gear adapted to mesh with and be driven by a worm gear 21 disposed on the shaft 4 which drives the fan 3. The shaft 4 is carried in suitable bearings disposed on the member 1 and is driven by a belt passing over pulley 22 secured thereto. Adjacent the worm gear 21, a collar 24 is pinned to the shaft 4 and at the other end of the worm, a sliding sleeve 23 is provided having an enlarged collar portion 23$^a$ at one end thereof, the end of which is adapted to be moved into engagement with the worm gear 21 and frictionally drive the same by means to be later described, it being understood that the worm gear 21 is loose on the reduced portion 4$^a$ of the shaft 4. The sleeve 23 is splined to the shaft 4$^a$ and is journaled in a bearing 25 secured to the member 1. The shaft 4$^a$ projects beyond this bearing and a collar 26 is disposed thereon, the reduced hub portion of which bears against the sleeve 23. Outward of the collar 26, a governor bracket 27 is secured to the shaft 4$^a$ and a pair of levers 28 having at their ends weights 29, are pivoted at the inner end of this bracket. The outer ends of the levers 28 are connected to coiled springs 30 which, at their inner ends are connected to a collar 31 sliding on the shaft 4$^a$.

An opening 32 is provided in the side of the conduit 6 substantially in alinement with the feed opening thereinto and a cover plate 33 is provided for the opening secured to the conduit by spaced cap screws. The purpose of this opening is to permit the removal of any large foreign matter which might find its way into the feeding opening or conduit and thus obstruct the same.

The operation of the device is as follows. Power being supplied to the pulley 22, the shaft 4 and fan 3 will be rotated. When the speed of the fan and shaft 4 reaches a certain point, the governor weights 29 will be thrown outwardly and the levers 28 will bear at their bent portions against the collar 26 which will be moved longitudinally on shaft 4 and will in turn move the sleeve 23. The enlarged portion 23$^a$ of this sleeve will then press against the worm gear 21 and frictionally drive the same. The clutch members 17 and 18 being permitted to engage, the shaft 14 will be driven through the beveled gears 15 and conveyor 13 applied to deliver grain into the grain chamber 8. The grain in this chamber will move down over the floor 8$^a$ and be evenly drawn into the conduit 6 by the suction of the current of air passing therethrough and upwardly into conduit 7. The grain will thus be fed into the latter conduit and blown or delivered to the desired point. When the speed of the fan is reduced, the weights 29 of the governor will again be drawn inwardly by springs 30 and the pressure of sleeve 23 against the worm gear 21 will be relieved. This will result in the stopping of conveyor 13 so that no more grain will be fed into the chamber 8 or into the conduit 6. When the fan speed again increases the worm and conveyor will again be driven or driven at increased speed. When the governor has been properly adjusted the device will operate continuously without attention and the supply of grain thereto will be accurately regulated by the governor and the friction driving means for the conveyor so that no clogging or choking of grain will occur. The gears 15 will, of course, be selected of the right ratio to maintain the speed of the feeding conveyor 13 sufficiently high to supply an amount of grain close to the capacity of the blower. If it be desired at any time to quickly disconnect the conveyor 13 the same can be done by operating the handle 20. It must be noted that the grain is not fed into the conduit 6 by the conveyor 13 but moves into said conduit from the floor 8$^a$ by gravity greatly assisted by the effect of the air current. The drawing of the grain into the delivery conduit by the air is due to the downwardly inclined floor 8$^a$ which contracts the conduit 6 adjacent the feed opening. By having the floor so downwardly inclined, all tendency of the air to back up and escape through the conveyor conduit is avoided.

It will, of course, be understood that various changes may be made in the form, details and arrangement of the device without departing from the scope of applicant's invention, which generally stated, consists in the matter shown and described and set forth in the appended claims.

What is claimed is:

1. A grain blower having in combination a blower fan, a fan casing enclosing the same having a delivery conduit extending from the lower portion thereof, a grain chamber disposed over said conduit and having an opening communicating therewith, the bottom of said grain chamber sloping downwardly into said conduit and forming the top wall thereof, the edge of said bottom forming the edge of the opening into the conduit nearest the fan, said edge being disposed in a plane below the plane of the top of the conduit beyond said chamber, a conveyor for delivering the grain across said bottom and an inclined delivery cleat supported on the upper side of said bottom.

2. A grain blower having in combination a fan and fan shaft, a fan casing inclosing the fan and a grain delivery conduit extending therefrom, a grain chamber disposed over said conduit, said conduit having an opening communicating with said chamber, a conveyor for moving grain into said chamber and into the top of said conduit, a governor on said fan shaft, a worm gear secured to said fan shaft, a worm wheel gear engaged thereby and carried by a shaft geared to said conveyor and a sleeve slidably movable on said fan shaft adjacent said worm gear and arranged to be moved by said governor to cause its end to frictionally engage the end of the worm gear when the speed of the governor is increased.

In testimony whereof I affix my signature.

JOHN F. VALLENTYNE.